(12) United States Patent
Eckhardt et al.

(10) Patent No.: US 7,868,166 B2
(45) Date of Patent: Jan. 11, 2011

(54) CONTINUOUS PROCESS FOR THE PRODUCTION AND/OR WORKUP OF POLYSACCHARIDE DERIVATIVES

(75) Inventors: Volker Eckhardt, Walsrode (DE); Martin Lohrie, Walsrode (DE); Bernd Schriewer, Walsrode (DE); Holger Tanneberger, Bad Fallingbostel (DE)

(73) Assignee: Dow Global Technologies Inc.

( * ) Notice: Subject to any disclaimer, the term of this patent is extended or adjusted under 35 U.S.C. 154(b) by 691 days.

(21) Appl. No.: 10/429,543

(22) Filed: May 2, 2003

(65) Prior Publication Data

US 2003/0220492 A1  Nov. 27, 2003

(30) Foreign Application Priority Data

May 7, 2002  (DE) ................................. 102 20 270

(51) Int. Cl.
  *C08B 5/02* (2006.01)
  *C08B 11/20* (2006.01)
  *C08B 31/08* (2006.01)
  *C08B 33/04* (2006.01)

(52) U.S. Cl. .......................... 536/55.3; 536/35; 536/45; 536/55.1; 536/85; 536/111; 536/124; 536/127

(58) Field of Classification Search ................. 536/124, 536/45, 127, 55.1, 55.3, 35, 85, 111, 11
See application file for complete search history.

(56) References Cited

U.S. PATENT DOCUMENTS

| 1,818,733 | A |   | 8/1931 | Milliken |
| 1,911,203 | A |   | 5/1933 | Page |
| 2,400,287 | A |   | 5/1946 | Cacsar et al. ................ 260/220 |
| 4,184,891 | A | * | 1/1980 | Pollozec et al. ................ 134/10 |
| 4,323,669 | A | * | 4/1982 | Bolleter et al. ................ 536/38 |
| 4,401,809 | A |   | 8/1983 | Fair ............................ 536/42 |

FOREIGN PATENT DOCUMENTS

| DE | 1 771 006 | 7/1971 |
| DE | 2 051 210 | 4/1972 |

\* cited by examiner

*Primary Examiner*—Shaojia Anna Jiang
*Assistant Examiner*—Ganapathy Krishnan

(57) ABSTRACT

A process is described for the continuous preparation and/or workup of polysaccharide derivatives by reaction and/or conditioning in a suspension with liquid reaction partners, in which, in accordance with FIG. 1, a) a preferably pumpable suspension stream of solids SE and liquid phase LE, if appropriate preheated to 185° C., is continuously introduced into the top region of a column, if appropriate under a pressure buffer of up to $6 \times 10^6$ Pa, which is virtually filled with the same liquid phase L, or another process-specific liquid phase L of preferably the same temperature, then b) the solids SE sediments freely due to the action of gravity through the liquid phase L to the column bottom, the solids SE converting to the solids SA by reaction and/or conditioning with the liquid phase L and c) possibly ascending gases G are discharged from the column via the column top and d) the solids SA is again continuously discharged as a suspension stream at the column bottom continuously by adding liquid phase LR taken off at the column top at a constant column filling level and transported in a separate connection, or liquid phase LN newly added from the outside to the column bottom.

9 Claims, 1 Drawing Sheet

CONTINUOUS PROCESS FOR THE PRODUCTION AND/OR WORKUP OF POLYSACCHARIDE DERIVATIVES

CROSS REFERENCE TO RELATED PATENT APPLICATION

The present patent application claims the right of priority under 35 U.S.C. §119 (a)-(d) of German Patent Application No. 10220270.2, filed May 7, 2002.

FIELD OF THE INVENTION

The invention relates to a process for the production and/or workup of polysaccharide derivatives. More specifically, the invention relates to a process for the production of cellulose ethers and cellulose esters, by a chemical reaction of ground, virtually pulverulent or short-fibre cellulose with predominantly liquid reaction partners in more or less solids-rich suspensions, and also to the subsequent treatment or workup of the solids with liquid media to wash or standardize the respective derivative before the final delivery form is obtained, via drying, grinding and is frequently the case, by special workup.

BACKGROUND OF THE INVENTION

The known multistage processes for producing and working up cellulose ethers have been comprehensively described in R. DÖNGES, "Entwicklungen in der Herstellung and Anwendung von Cellulosethern" [Developments in the production and use of cellulose ethers], "DAS PAPIER", 12/1997, pp. 653-660. This publication describes processes for carrying out the alkaline activation of the cellulose and respective etherifications thereof, and the subsequent workup and purification procedures of the resultant cellulose ethers for removing salts, minor organic components and the regeneration of suspension media.

These processes are disadvantaged in that they require a multiplicity of large usually pressure-tight vessels having mechanical agitators and mixers, especially heat exchangers, various transport, separation and drying and comminution units, and comprehensive control and instrumentation systems. The processes are further disadvantaged in that they are time-consuming and demanding in terms of equipment and are extremely material- and energy-consuming and produce polluted liquid waste products.

The known processes for preparing cellulose esters may also be characterized in a comparable manner. Illustratively, the production and workup of cellulose nitrate (usually called nitrocellulose) have been described in numerous publications, for example German Auslegungsschrift 1 771 006, U.S. Pat. Nos. 4,401,809, 1,818,733, 1,911,203, German Offenlegungsschrift 2 051 210. According to these processes, high-volume stirred tanks, stirred autoclaves, centrifuges and various other capital-intensive machines and apparatus are used, not only in cellulose nitration, but also for deacidifying the nitrocellulose and especially for standardizing product specifications, for example solution viscosity and chemical stability. This, is still the state of the art and characteristic of said production processes.

The batchwise procedure, which still prevails today in most fabrication stages of the known processes for producing and/or working up polysaccharide derivatives, is characterized by considerable complexity and personnel requirements. Moreover, the procedure causes variations in processing and quality parameters, as a result of which subsequent compensation measures (for example complex remixing operations of individual batches in correspondingly large mixing apparatuses) for post-standardizing the desired product specifications are the norm.

It is, therefore, an object underlying the present invention to provide a process which is continuous throughout for the preparation and/or workup of polysaccharide derivatives, for example cellulose derivatives or starch derivatives.

SUMMARY OF THE INVENTION

The invention is described with particular reference, but without limitation to FIG. 1. According to the invention, the object is achieved by a process, in accordance with FIG. 1, wherein a suspension stream, which has been optionally preheated to a preset temperature of up to 185° C. which has been determined by the process conditions and is of solids SE and relevant liquid phase LE, is continuously introduced under control into the top region of a column which is, if appropriate, pressurized at up to $6 \times 10^6$ Pa and is filled with the same liquid or, depending on the process conditions, another, liquid phase L preferably at the same preset temperature, which suspension stream, as a result of the flow delay established there and the given density difference between solid and liquid phase, continuously separates. Then, the solids SE, recognized to have a higher specific gravity than the liquid phase, sediments with surprisingly uniform settling speed freely through the liquid phase bath L to the column bottom. On the path there, the sediment is subjected to reaction or conditioning conditions, in a particularly uniform manner during its conversion to the solids SA, In particular, the sediment is subjected to conditions of temperature and residence time. By the term conditioning is meant workup after preparation, as described more fully hereinafter. From the bottom of the column the solids SA sedimenting there, is chemically reacted and/or conditioned, and is again continuously completely ejected preferably as a pumpable suspension stream, with a constant filling level being maintained. Depending on the process, this is optionally achieved, in accordance with FIG. 1, by taking off the virtually clarified liquid-phase stream LR, which is separated from the suspension inflow stream in the column top region. From there, either proportionately, completely or in excess of the amount of the inlet stream of liquid phase LE, under control, the virtually clarified liquid-phase (which is taken off) is added back in the column bottom to the sedimenting solids SA continuously by means of a pump P or replaced with another liquid-phase stream LN. Any released gases G ascending from the liquid-phase bath L in the column chamber are collected in the gas space of the column top and there discharged separately from the said liquid-phase stream LR.

SE: suspended solids, entry state

Figure 1:
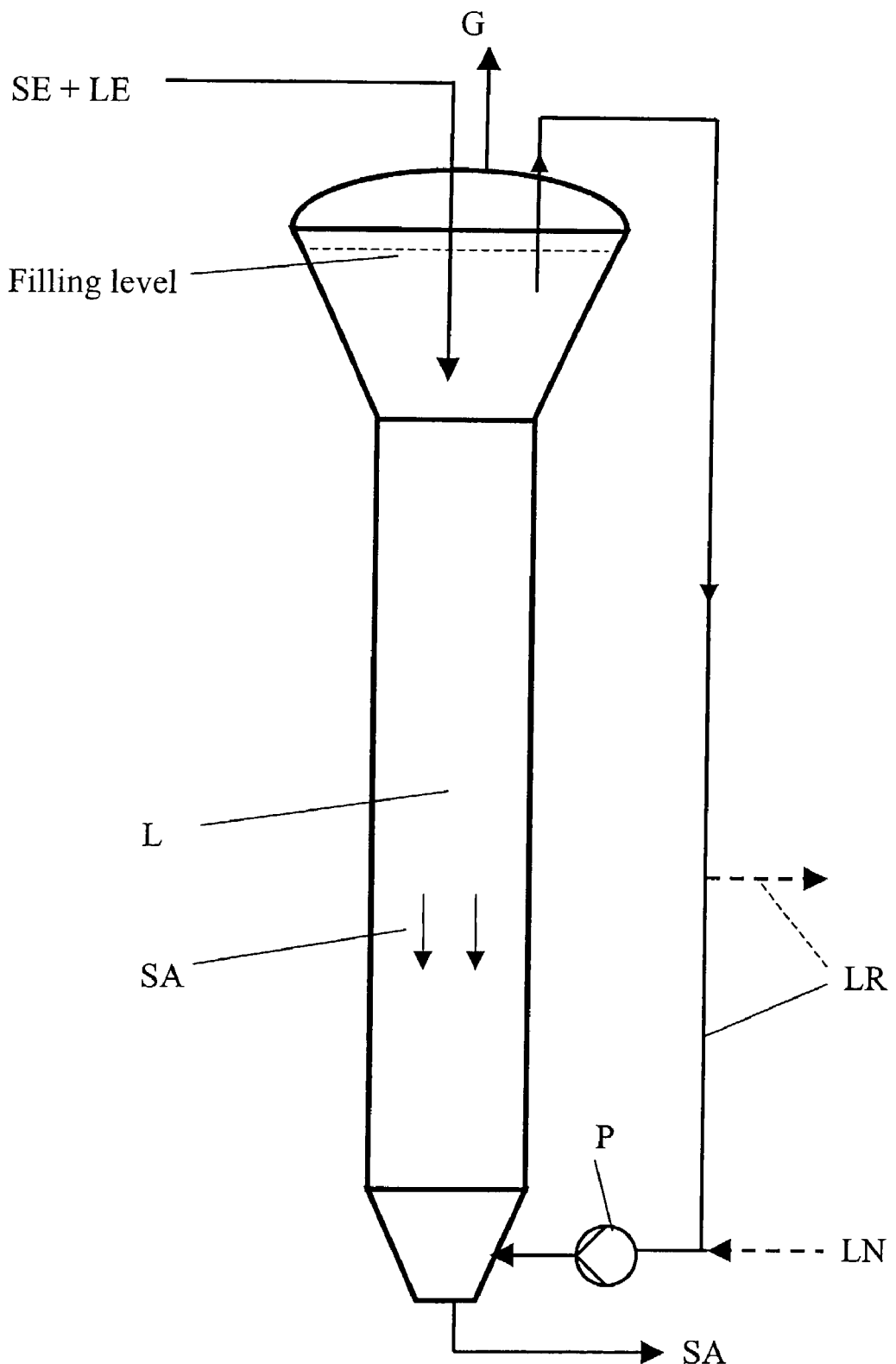
FIG. 1, depicts the column in terms of the solids and liquid phases and their states of entry, exit, filling level, and a transport pump for injecting liquid phases as follows.

LE: liquid phase as suspension medium for SE

LR: liquid phase taken off from column top, separated from SE

L: constant liquid phase content in the column

LN: liquid phase new, possibly substituted for LR

SA: suspended solids, exit state
G: any gases/vapours to be taken off
P: transport pump for injecting LR and/or LN

DETAILED DESCRIPTION OF THE INVENTION

In a preferred embodiment, the invention relates to a process for the continuous preparation and/or workup of polysaccharide derivatives by reaction and/or conditioning in a suspension with liquid reaction partners, in which, in accordance with FIG. 1, a) a preferably pumpable suspension stream of solids SE and liquid phase LE which is preheated to a temperature which is preset in each case by process conditions, if appropriate up to 185° C. is continuously introduced into the top region of a column, if appropriate under a pressure buffer of up to $6 \times 10^6$ Pa, which column is virtually filled except for a gas space in the column top with the same liquid phase LE or another process-specific liquid phase L of preferably the same temperature, then b) the solids SE sediments freely due to the action of gravity through the liquid phase L to the column bottom, the solids SE converting to the solids SA by reaction and/or conditioning with the liquid phase L and c) possibly ascending gases G are discharged from the column via the column top and d) the solids SA are continuously discharged as a suspension stream at the column bottom by adding liquid phase LR which has been previously taken off at the column top at a constantly maintained column filling level, and transported in a separate connection and/or again continuously discharged by liquid phase LN newly added to the column bottom from the outside.

In accordance with the invention, the process is further characterized in that in step d), volumetric flow ratios of the liquid-phase streams LR and/or LN to the inlet stream LE, a cocurrent flow of LE or a counter flow of LR and/or LN in the desired magnitude to the sedimenting solid SA is set.

By reaction or conditioning, the solids SE converts to the solids SA on the path through the liquid bath L. Illustratively, this can be achieved continuously in the inventive manner, for example, using cellulose preferably ground to short fibres on activation thereof in aqueous sodium hydroxide solution before etherification thereof in particular to form methyl cellulose (MC) or carboxymethylcellulose (CMC). For the subsequent etherification of the thus alkaline-activated cellulose using monochloroacetic acid to give CMC, a suspension of cellulose in known inert liquid phases, for example isopropanol, is also employed in the inventive process. This is done just as advantageously as in the customarily subsequent purification of the CMC, in particular from salts present. The same applies to the preparation MC from alkaline-activated cellulose by suspension in methyl chloride under reaction conditions, which are known per se. The solids content in the suspension used is that which is preferably effective to ensure that it is free flowing or what is termed pumpability. In accordance with the invention, the solid content is less than 12% by weight of the suspension. However, if, instead of short-fibred solids, fine pulverulent solids are already present and/or if the process can be carried out at atmospheric pressure as a result of only moderate temperatures, infeed and outlet suspensions having solids concentrations far above 50% by weight are usable according to the invention. In the practice of the invention, customary transport units at the top and bottom of the column are usable.

Conditioning of a polysaccharide derivative is taken to mean here the workup after preparation, for example removing accompanying products and minor products by a selective washing medium and also the thermal breakdown of the polysaccharide derivative macromolecules for specific standardization of a viscosity adapted to the appropriate use. An example of such thermal conditioning is the pressure cooking of nitrocellulose.

In accordance with the invention, one can impart improvement to the composition and properties of the solid suspension on exit from the column bottom, in accordance with FIG. 1, under a constant column filling level, when the discharged stream LR is replaced by a newly entering, larger stream LN, and a controlled counterflow against the sedimenting solids SA in the column is generated which, in addition to a possible improved heating, particularly favours the concentration-dependent and diffusion-dependent mass transfer processes corresponding momentum buildup between sedimenting solids SA and preferably fresh/different liquid phase L in the column.

The inventive process is also distinguished by the fact that the continuous free sedimentation process of the solid SA through the liquid-phase bath L in the column proceeds surprisingly uniformly in the technically interesting range, substantially independently of the solid and suspension throughput (SE+LE) and proceeds with virtually uniformly distributed settling speed which is critically dependent, however, on the respective system SE/SA and L. Accordingly owing to the inventive optional separation of a virtually clarified liquid-phase stream LR from the inlet stream LE at the column top, continuous throughput and residence time especially of the solids SA are virtually decoupled from one another. This is in contrast to known continuous flow reactors (for example stirred-tank cascade or flow tube).

For continuous preparation and/or conditioning, in particular for preparation and subsequent conditioning, the inventive process in the respective process step in each case may also be used in a plurality of individual columns which are mounted separately and are preferably connected in series. In this case the suspension stream discharged from the bottom of the previous column is introduced into the top of the later column.

By means of the inventive continuous process, polysaccharide derivatives and comparable solids are produced and/or worked up in a particularly space-, material- and energy-saving manner and optionally according to cocurrent or countercurrent flow of the phases. The invention permits a comparatively wide breadth of variation of the process parameters with stable continuous operating conditions with comparatively uncomplicated apparatus in combination with a very high degree of automation.

The inventive process operates advantageously, compared with the known processes, owing to its simple apparatus requirements and economic energy requirements, the high liquid-phase utilization by cocurrent or countercurrent and circulation conditions and the reduced production of polluted liquid phases, not only significantly more inexpensively, but in particular, also more reliably, because, based on the same plant capacities, the solids content in the reaction space of a column alone is only a fraction of a customary batch in the currently known fabrication plants.

Preferably, the inventive process is used for preparing and/or working up the polysaccharide derivatives, which are cellulose derivatives. Particular preference is given here to carboxymethylcellulose, nitrocellulose or methylhydroxyalkylcellulose. In a further preferred embodiment, the inventive process is used for polysaccharide derivatives, which are starch derivatives, in particular for carboxymethyl starch.

Advantageously, the inventive process is also used for conditioning cellulose derivatives, in particular for the pressure cooking of nitrocellulose. In the pressure cooking, as is known, nitrocellulose is heated at a pressure of up to $5\times10^5$ Pa in hot water having a temperature of up to 150° C. Certain viscosities may be established in this manner owing to thermal breakdown of the nitrocellulose molecules. Because the inventive process permits higher temperatures here, the pressure-cooking process can be completed much more rapidly than in the conventional processes.

The inventive process is to be described in more detail without limitation, using two exemplary embodiments.

EXAMPLE 1

A thickened suspension stream coming from the etherification stage of 440 kg/h having approximately 70% by weight of carboxymethylcellulose SE and residual salt-containing isopropanol-water mixture LE (termed CMC dense slurry) is introduced continuously under control at a temperature of about 50° C. into the top of an unpressurized column virtually completely filled with what is termed cleaning agent L, a mixture of isopropanol, methanol and a little water, also at 50° C. The CMC sediments uniformly and evenly distributes as solids SA through the cleaning-agent bath L to the column bottom. There, a fresh cleaning-agent stream LN is introduced under constant control by means of the pump P at a rate of 0.65 m³/h and a temperature of 50° C. in order to be able not only to discharge the sedimenting CMC again as concentrated dense slurry of about 53% by weight solids continuously from the column bottom in a stream of approximately 575 kg/h at a constant filling level, but also to produce a counterflow of cleaning agent to the column top. This substantially takes up salts and accompanying substances from the CMC settling in the opposite direction, before it is uniformly ejected as loaded cleaning agent LR at the top of the column at a rate of approximately 0.48 m³/h, increased by the volumetric flow rate of the liquid phase LE of the incoming suspension medium.

EXAMPLE 2

In the preparation of nitrocellulose (NC), the known process steps of cellulose nitration and removal of nitrating acid and prestabilization are followed by what is termed pressure cooking of the NC in hot water in order to eliminate accompanying substances and by-products. This can be done, in particular, by specific thermal breakdown of the NC macromolecules, to achieve the viscosities especially required by the paint industry of the NC solutions later produced. A suspension stream of 2.5 m³/h for pressure cooking having approximately 8% by weight of NC sediment (SE) and the remainder water, LE is heated to 170° C. before it continually enters the top of a column filled with hot water at 170° C. and having a pressure buffer of $9\times10^5$ Pa. The NC as solid of higher specific gravity begins to sediment freely through the hot water bath L in the cylindrical column body and is simultaneously appropriately thermally degraded during its settling time to the column bottom depending on the temperature chosen. Cleavage products transfer to the water bath L, any gas bubbles G ascending collect in the gas space of the column top and are discharged from there. A substream LR of 1.9 m³/h of virtually clarified hot water is taken off from the column top by means of a pump P above the suspension inlet and transported to the column bottom in order to be able to discharge continuously the appropriately standardized NC sedimenting (SA) there, again without problems as pumpable suspension stream at a level of 2.5 m³/h. The remaining residual stream of the inlet water stream LE which, because of the controlled constant filling level in the column, is also constant, flows in the same direction as the sedimenting NC to the column bottom and ensures on the path there the heat exchange in the hot water volume L and temperature maintenance in the column.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the continuous conditioning and/or reacting of a polysaccharide material comprising:
    a) providing a column having a top portion, a bottom portion and an interior, said interior of said column being substantially filled with a column liquid phase L, and said column having a column liquid phase level;
    b) introducing continuously a suspension feed stream, comprising a solids phase SE and a liquid phase LE, into said top portion of said column, said suspension feed stream being optionally preheated to a temperature up to 185° C., said column being optionally under a pressure buffer of up to $6\times10^6$ Pa, said column liquid phase L being the same or different than said liquid phase LE of said suspension feed stream, and said column liquid phase L having optionally the same preset temperature as said suspension feed stream,
    wherein said solids phase SE is a polysaccharide material selected from the group consisting of cellulose, starch, carboxymethyl cellulose, nitrocellulose, methylcellulose, methylhydroxyalkylcellulose, carboxymethyl starch, and combinations of any of these, and said liquid phase LE is a suspension medium for said solids phase SE, said liquid phase LE comprising water and optionally isopropanol;
    c) allowing the solids phase SE to sediment freely, due to the action of gravity, through the column liquid phase L to the bottom portion of said column, with the solids phase SE being converted to a solids phase SA by contact at said solids phase SE with the column liquid phase L;
    d) discharging from the top portion of said column ascending gases G that are optionally formed within said interior of said column; and
    e) without centrifuging, discharging continuously the solids SA together with a bottoms liquid phase LR and/or LN as a suspension stream at the column bottom at a constant column filling level by adding liquid phase LR previously taken off at the column top and transporting it separately to the column bottom and/or by a liquid phase LN, newly added from outside to the column bottom.

2. The process of claim 1, further comprising controlling sedimentation of said solids phase SA sedimentation by selecting a volumetric flow ratio of (1) said bottoms liquid phase LR and/or LN introduced into said bottom portion of said column to (ii) said liquid phase LE introduced into said top portion of said column.

3. The process of claim 1, further comprising providing a plurality of columns connected in series, wherein a bottoms suspension stream ejected from the bottom portion of a preceding column is introduced into the top portion of a succeeding column.

4. The process of claim 1, wherein the polysaccharide material is a cellulose derivative selected from the group consisting of nitrocellulose, methylcellulose, carboxymethylcellulose, and methylhydroxyalkylcellulose.

5. The process of claim 1, wherein the polysaccharide material is carboxymethyl starch.

6. The process of claim 1, wherein the polysaccharide derivative is nitrocellulose, and the process is carried out as a pressure-cooking process.

7. A process for the continuous conditioning and/or reacting of polysaccharide derivatives comprising:
   introducing continuously a suspension feed stream, comprising a solids phase SE comprising a polysaccharide material selected from the group consisting of cellulose, starch, carboxymethyl cellulose, nitrocellulose, methylcellulose, methylhydroxyalkylcellulose, carboxymethyl starch, and combinations of any of these, and a liquid phase LE comprising water and optionally isopropanol, into a top portion of a column having a liquid phase L;
   allowing the solids phase SE to sediment freely, due to the action of gravity, through the column liquid phase L to the bottom portion of the column, with the solids phase SE being converted to a solids phase SA;
   without centrifuging, discharging continuously the solids SA together with a bottom liquid phase as a suspension stream at the bottom portion of the column; and
   adding to the bottom portion of the column liquid phase LR previously taken off at the column top and/or a liquid phase LN, newly added from outside to the column bottom.

8. A process for the continuous conditioning and/or reacting of polysaccharide derivatives, comprising:
   sedimenting due to the action of gravity from the top to the bottom of a column having a liquid phase L, a suspension feed stream, comprising a solids phase SE comprising a polysaccharide material selected from the group consisting of cellulose, starch, carboxymethyl cellulose, nitrocellulose, methylcellulose, methylhydroxyalkylcellulose, carboxymethyl starch, and combinations of any of these, and a liquid phase LE comprising water and optionally isopropanol, with the solids phase SE being converted to a solids phase SA; and
   without centrifuging, discharging continuously the solids phase SA together with a bottom liquid phase as a suspension stream at the bottom portion of the column.

9. The process of claim 8, further comprising creating a partial back flow of liquid phase from the bottom of the column to the top by introduction of liquid phase LR previously taken off at the column top and/or a liquid phase LN, newly added from outside, to the bottom.

* * * * *